(12) United States Patent
Chapman

(10) Patent No.: US 9,566,887 B2
(45) Date of Patent: Feb. 14, 2017

(54) SEAT COVER, MAINTENANCE KIT, AND VEHICLE

(71) Applicant: David Chapman, Coalville Leicestershire (GB)

(72) Inventor: David Chapman, Coalville Leicestershire (GB)

(73) Assignee: INTERNATIONAL TOOL COMPANY LIMITED, Coalville, Leicestershire (GB)

( * ) Notice: Subject to any disclaimer, the term of this patent is extended or adjusted under 35 U.S.C. 154(b) by 12 days.

(21) Appl. No.: 14/382,209

(22) PCT Filed: Mar. 1, 2013

(86) PCT No.: PCT/GB2013/050514
§ 371 (c)(1),
(2) Date: Aug. 29, 2014

(87) PCT Pub. No.: WO2013/128203
PCT Pub. Date: Sep. 6, 2013

(65) Prior Publication Data
US 2015/0061335 A1     Mar. 5, 2015

(30) Foreign Application Priority Data

Mar. 1, 2012   (GB) .................................. 1203650.5

(51) Int. Cl.
*B60N 2/60*     (2006.01)
*B60N 2/58*     (2006.01)

(52) U.S. Cl.
CPC .......... *B60N 2/6018* (2013.01); *B60N 2/5816* (2013.01); *B60N 2/6027* (2013.01); *B60N 2/6054* (2013.01); *B60N 2/6063* (2013.01)

(58) Field of Classification Search
CPC ....................................................... B60N 2/60
(Continued)

(56) References Cited

U.S. PATENT DOCUMENTS

| 1,820,104 A | * | 8/1931 | Whaley | ............... | A47C 31/11 |
| | | | | | 297/224 |
| 1,836,302 A | * | 12/1931 | Bloomfield | ............ | B60N 2/609 |
| | | | | | 297/229 |

(Continued)

FOREIGN PATENT DOCUMENTS

| DE | 29816557 | 9/1992 |
| DE | 20007237 | 3/1999 |
| EP | 0983895 | 3/2000 |
| EP | 1193118 | 4/2002 |
| FR | 2673366 | 8/2000 |

(Continued)

OTHER PUBLICATIONS

PCT, International Search Report, PCT/GB2013/050514; May 2, 2013.

(Continued)

*Primary Examiner* — Timothy J Brindley
(74) *Attorney, Agent, or Firm* — Morgan, Lewis & Bockius LLP

(57) ABSTRACT

A seat cover, maintenance kit, and vehicle A removable seat cover for a seat of a vehicle, the removable seat cover comprising: a first (1A) and a second (IB) portion; a first coupling arrangement (14) configured to couple the first and second portions of the seat cover; at least one attachment arrangement (9) configured to fit the seat cover with respect to a seat of a vehicle, wherein the first coupling arrangement is configured such that the decoupling of the attachment arrangement permits the first and second portions of the seat cover to be moved with respect to each other whilst the seat cover is substantially fitted with respect to the seat.

18 Claims, 5 Drawing Sheets

Figure 1:
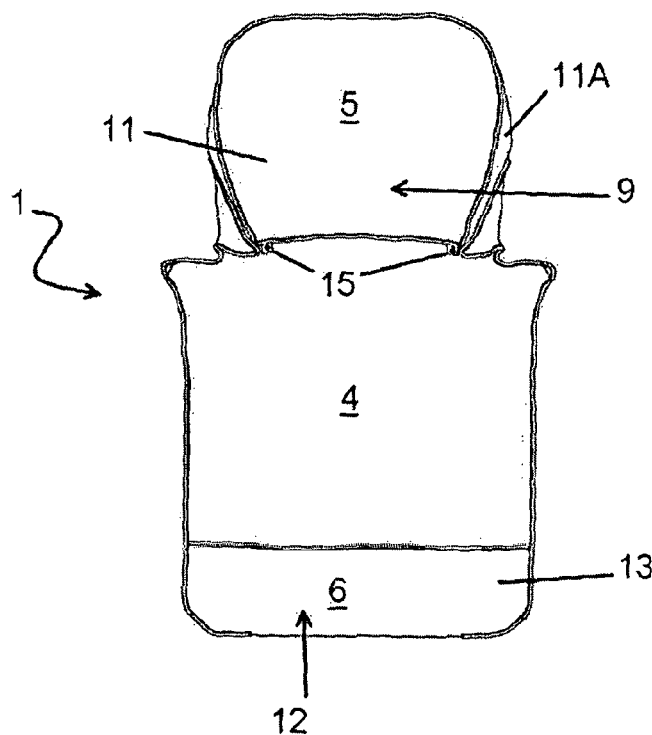

(58) Field of Classification Search
USPC .................................. 297/220, 221, 228.12
See application file for complete search history.

(56) References Cited

U.S. PATENT DOCUMENTS

| | | | | |
|---|---|---|---|---|
| 2,782,839 | A * | 2/1957 | Cole | A47D 15/006 297/228.12 |
| 4,396,227 | A | 8/1983 | Neilson | |
| 5,265,933 | A | 11/1993 | Croshaw | |
| 5,709,431 | A * | 1/1998 | Horn | B60N 2/6063 297/219.1 |
| 5,803,539 | A * | 9/1998 | Dewar | B60N 2/6054 297/228.1 |
| 5,806,925 | A * | 9/1998 | Hanley | A47C 31/113 297/219.1 |
| 6,655,735 | B1 * | 12/2003 | Learning | A47C 31/116 297/228.1 |
| 6,655,737 | B2 * | 12/2003 | Hyduk | A47C 5/06 297/228.12 |
| 7,000,984 | B1 * | 2/2006 | Ward | A47C 31/113 297/188.2 |
| 7,607,732 | B2 * | 10/2009 | Beroth | B60N 2/6054 297/219.1 |
| 7,841,658 | B1 * | 11/2010 | Marble | B60N 2/4879 150/158 |
| 7,931,335 | B1 | 4/2011 | Siklosi et al. | |
| D663,153 | S * | 7/2012 | Kenkelen | D6/611 |
| 8,500,198 | B2 * | 8/2013 | Sugiura | B60N 2/6009 297/228.1 |
| 8,733,836 | B2 * | 5/2014 | Gross | A47C 7/22 297/228.12 |
| 2002/0063454 | A1 * | 5/2002 | Illulian | A47C 31/11 297/228.12 |
| 2003/0085598 | A1 * | 5/2003 | Monday | B60N 2/6036 297/228.12 |
| 2005/0093351 | A1 * | 5/2005 | Simianer | A47C 31/11 297/228.12 |
| 2007/0040426 | A1 | 2/2007 | Kenny | |
| 2010/0140993 | A1 * | 6/2010 | DePasquale | A47C 31/11 297/220 |
| 2014/0150156 | A1 * | 6/2014 | Sprague | A47K 10/02 2/69 |

FOREIGN PATENT DOCUMENTS

| | | |
|---|---|---|
| GB | 2459254 | 10/2009 |
| JP | 10119694 | 5/1998 |

OTHER PUBLICATIONS

PCT, Written Opinion, PCT/GB2013/050514; May 2, 2013.
GB Intellectual Property Office, GB1203650.5, Search Report Under Section 17.
Partial Translation of JP 10119694 (Miyata).
Partial Translation of DE 20007237 (Diana KFZ Textil GMBH).

* cited by examiner

SEAT COVER, MAINTENANCE KIT, AND VEHICLE

This Application is the National Phase Application of International Application No. PCT/GB2013/050514 filed on 1 Mar. 2013, which claims priority to GB Application No. 1203650.5, filed on 1 Mar. 2012.

Embodiments of the present invention relate to covers for seats. More particularly, embodiments of the present invention relate to removable covers for vehicle seats. Embodiments of the present invention also relate to maintenance kits including such covers and vehicles having seats to which such covers are fitted.

A mechanic working on a vehicle is often dressed in clothes or overalls which are soiled with, for example, oil. As part of their work on a vehicle the mechanic is often required to sit in the driver's seat in order to start the engine of the vehicle, move, and/or test drive the vehicle. However, the soiled clothing of the mechanic can mark the upholstery of the driver's seat.

As a result, typically, temporary seat covers are provided which are secured to one or more seats of the vehicle over the seat upholstery. The temporary seat covers protect the upholstery of the seats.

Conventional temporary seat covers, however, can hinder access to seat belts associated with the seats to which they are fitted. Furthermore, temporary seat covers can hinder the deployment of seat mounted airbags.

Embodiments of the present invention seek to ameliorate one or more problems associated with the prior art.

Accordingly, an aspect of the present invention provides a removable seat cover for a seat of a vehicle, the removable seat cover comprising: a first and a second portion; a first coupling arrangement configured to couple the first and second portions of the seat cover; and at least one attachment arrangement configured to fit the seat cover with respect to a seat of a vehicle, wherein the first coupling arrangement is configured such that the decoupling of the attachment arrangement permits the first and second portions of the seat cover to be moved with respect to each other whilst the seat cover is substantially fitted with respect to the seat.

The seat cover may configured to cover at least a part of a seat back, a seat squab and a seat headrest of the seat; the first and second portions of the seat cover may be defined by a slit which extends across at least part of a width of a main panel of the seat cover; and the first coupling arrangement may be a re-coupleable coupling arrangement.

The seat cover may further comprise: a third and fourth portion; and a second coupling arrangement configured to couple the third and fourth portions of the seat cover, wherein the second coupling arrangement is configured such that the decoupling of the attachment arrangement permits the third and fourth portions of the cover to be moved with respect to each other whilst the seat cover is substantially fitted with respect to the seat.

The third and fourth portions of the seat cover may be defined by a slit which extends across at least part of a width of a main panel of the seat cover; and the second coupling arrangement may be a re-coupleable coupling arrangement.

The at least one attachment arrangement may include a pocket configured to receive at least a portion of a back of the seat.

The at least one attachment arrangement may include a pocket configured to receive at least a portion of a squab of the seat.

The seat cover may include a main panel.

The first portion of the seat cover may be a portion of the main panel.

The second portion of the seat cover may be a portion of the at least one attachment arrangement.

The second portion of the seat cover may be a portion of the main panel.

The first and second portions of the seat cover may be defined by a slit in the main panel.

The slit may extend across part of a width of the main panel.

At least part of the coupling arrangement may be provided on the at least one attachment arrangement.

The at least one attachment arrangement may include an arrangement to attach a first part of the seat cover to the back of a seat and the first portion of the seat cover is a portion of the first part of the seat cover.

A main panel of the seat cover may be configured to cover at least a part of a seat back, a seat squab, and a seat headrest of the seat.

Another aspect of the present invention provides a vehicle maintenance kit including such a seat cover.

Another aspect of the present invention provides a vehicle including a vehicle maintenance kit.

Another aspect of the present invention provides a vehicle including a seat to which such a seat cover.

Figure 2:
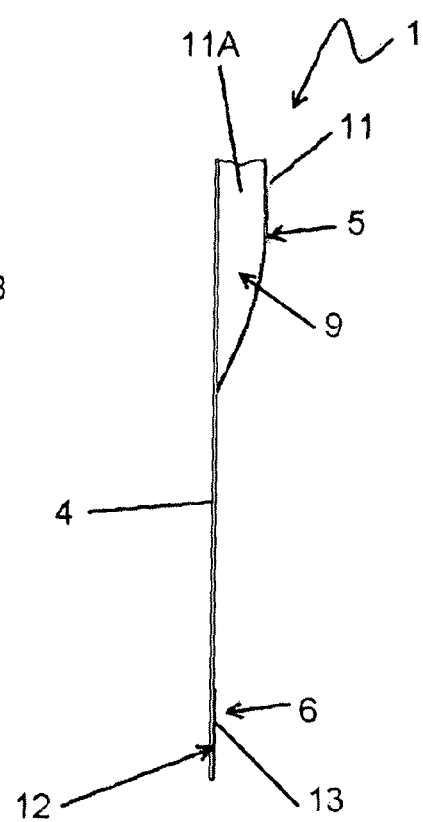
Figure 3:
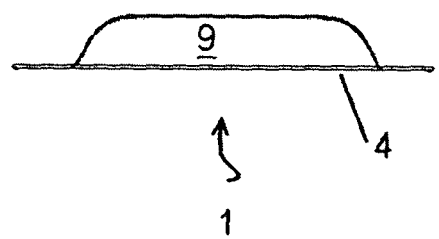
Figure 4:
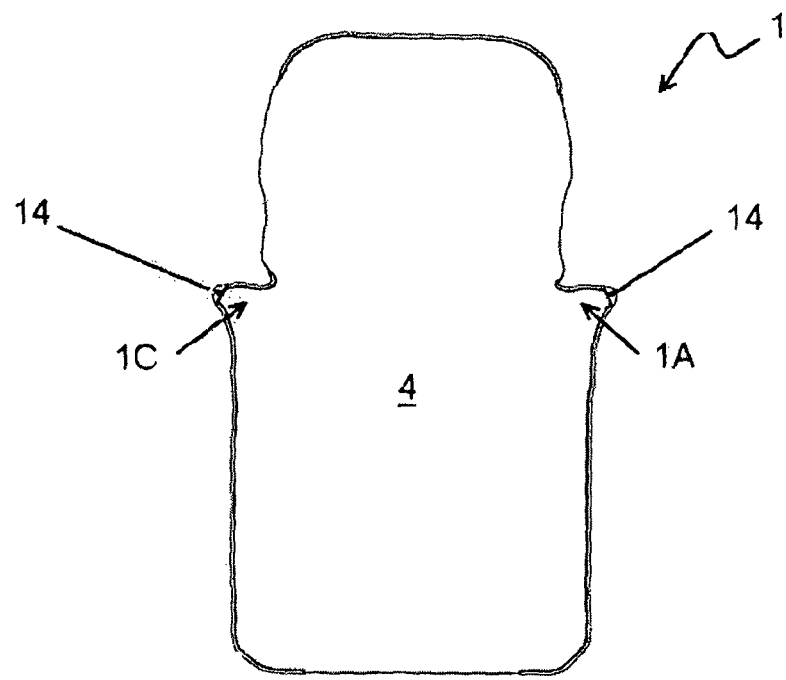
Figure 5:
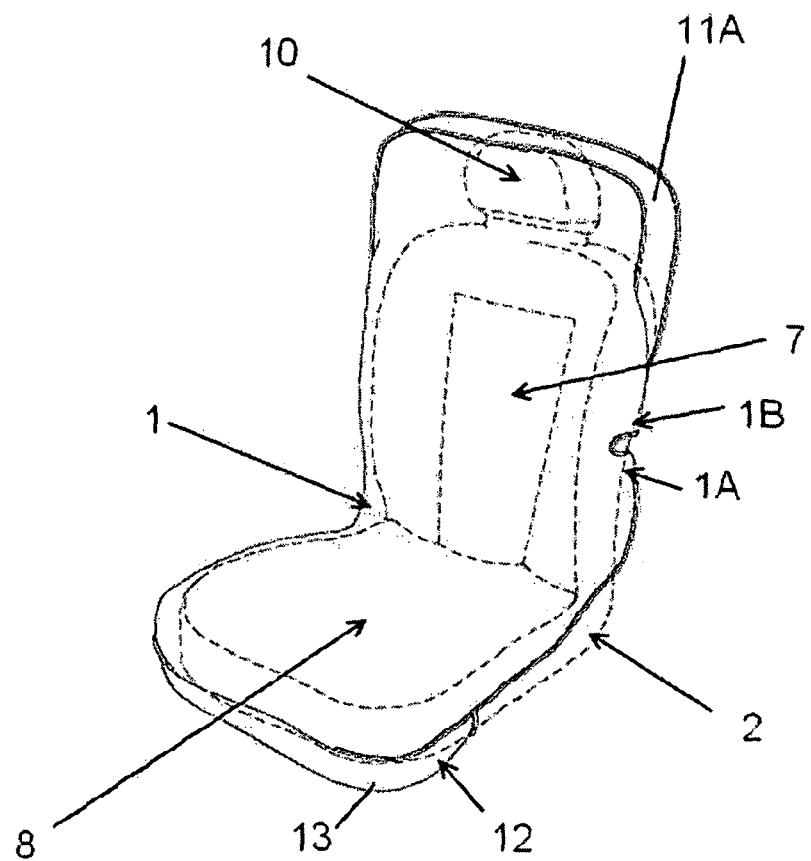
Figure 6:
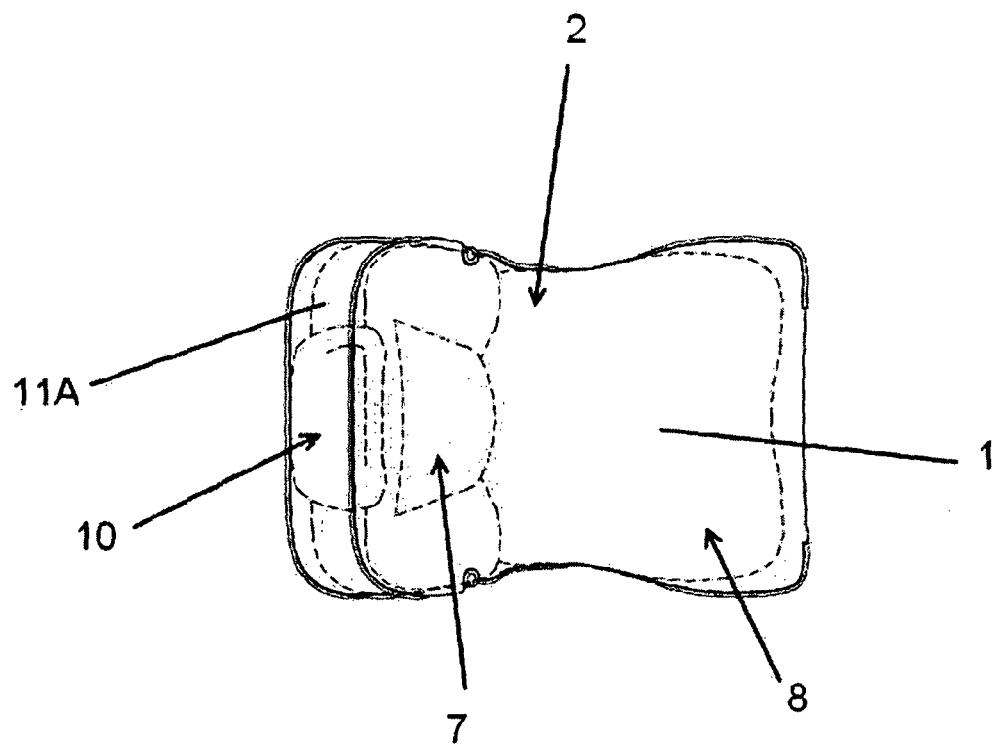
Figure 7:
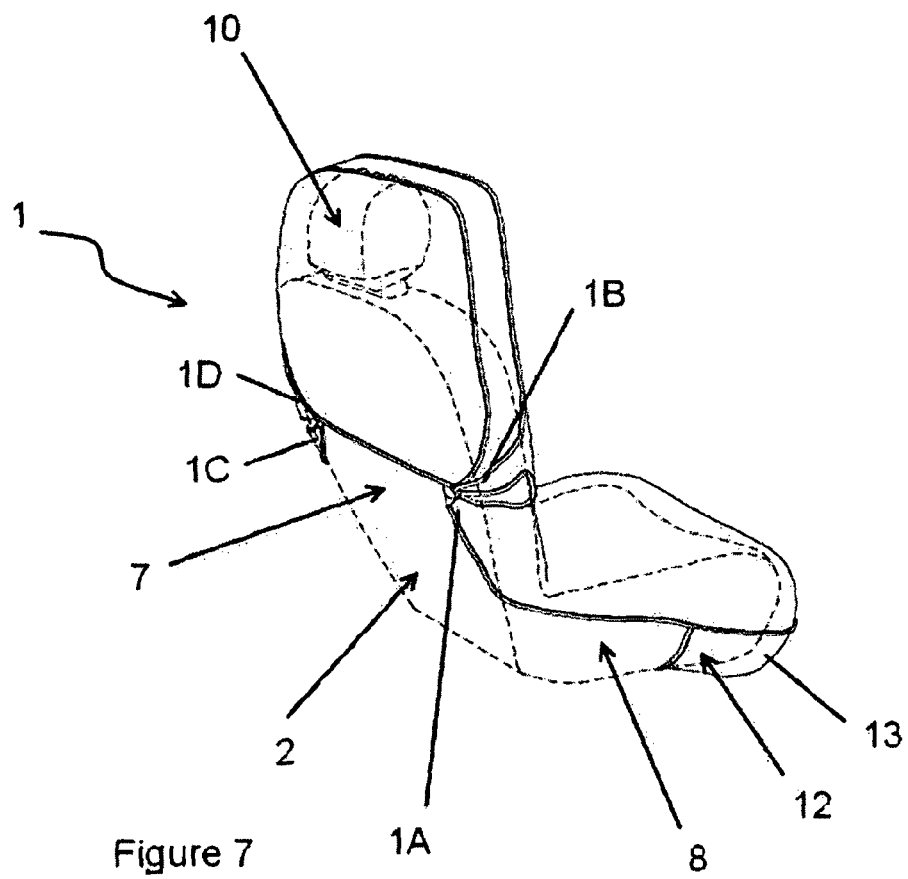

Aspects of embodiments of the present invention are described herein, by way of example only, with reference to the accompanying drawings, in which:

FIG. 1 shows a rear view of an embodiment;
FIG. 2 shows a side view of an embodiment;
FIG. 3 shows an end view of an embodiment;
FIG. 4 shows a front view of an embodiment;
FIG. 5 shows a view of a seat cover according to an embodiment fitted to a seat;
FIG. 6 shows a view of a seat cover according to an embodiment fitted to a seat; and
FIG. 7 shows a view of a seat cover according to an embodiment fitted to a seat.

With reference to FIGS. 1-7, an embodiment of the present invention includes a seat cover 1 for covering the seat 2 of a vehicle 3.

The seat cover 1 includes a main panel 4 configured to cover a substantial part of the seat 2 to protect at least part of the upholstery of the seat 2 from being soiled or otherwise damaged. The main panel 4 is securable to the seat 2 by a first 5 and a second 6 attachment arrangement. The first attachment arrangement 5 is configured to secure a first part of the main panel 4 of the cover 1 with respect to the back 7 of the seat 2. The second attachment arrangement 6 is configured to secure a second part of the main panel 4 of the cover with respect to a squab 8 of the seat 2. The first and second parts of the main panel 4 may be integrally formed.

In embodiments, only one attachment arrangement is provided to secure the main panel 4 with respect to the seat 2. In other embodiments, more than two attachment arrangements are provided.

The first attachment arrangement 5 is, in embodiments, formed by the provision of a first pocket 9. The first pocket 9 is configured to receive at least part of the back 7 of the seat 2. In embodiments, the back 7 of the seat 2 includes a headrest 10 of the seat 2 and the headrest 10 may be entirely or partially received by the first pocket 9.

The first pocket 9 extends along a length of the main panel 4 and across substantially an entire width of the main panel 4. The first pocket 4 is located adjacent a rear surface of the main panel 4. The first pocket 9 may be formed by a first pocket panel 11 which is secured to the main panel 4 around at least part of the periphery of the first part of the main panel 4. The first pocket 9 has an opening which generally faces towards the second part of the main panel 4 of the seat cover 2.

The second attachment arrangement 6 is, in embodiments, formed by the provision of a second pocket 12. The second pocket 12 is configured to receive at least part of the squab 8 of the seat 2. The second pocket 12 extends along a length of the main panel 4 and across substantially an entire width of the main panel 4. The second pocket 12 is located adjacent a rear surface of the main panel 4. The second pocket 12 may be formed by a second pocket panel 13 which is secured to the main panel 4 around at least part of the periphery of the second part of the main panel 4. The second pocket 12 has an opening which generally faces towards the first part of the main panel 4 of the seat cover 2.

Thus, in embodiments, the main panel 4 has a rear and a front surface. The first and second pockets 9, 12 are provided adjacent the rear surface of the main panel 4. The front surface of the main panel 4 is configured to be a contact surface—in other words, the surface which a user contacts when seated on a seat 2 to which the cover 1 has been fitted.

In embodiments, at least part of the first 9 and/or second 12 pockets are formed by the main panel 4 of the cover 1.

In embodiments, the first pocket 9 and main panel 4 may be formed by providing an elongate sheet of material and folding the material towards one end thereof across a width of the sheet (i.e. along a line which is generally perpendicular to the longitudinal axis of the sheet). The material of the sheet of material towards one side of the fold generally forms the main panel 4 and the material of the sheet of material towards the other side of the fold generally forms the first pocket panel 11. The overlapping edges of the folded sheet of material are then attached to each other to form the first pocket 9. Sections of the sheet of material adjacent the fold may be removed to provide a curved end of the cover 1.

Piping may be provided at the edges of main panel 4 and the first pocket panel 11 to reinforce the panels and reduce the risk of the material used to form the panels 4, 11 tearing or otherwise being damaged.

The second pocket 12 may, in embodiments, be formed in a similar manner—by folding the sheet of material along a line across a width of the sheet towards the opposing end of the sheet to which the first pocket 9 is formed (thereby defining the second pocket panel 13). The overlapping edges of the folded sheet are then attached to each other to form the second pocket 12. Sections of the sheet of material adjacent the fold may be removed to provide a curved end of the cover 1. Piping may be provided at the edges of the main panel 4 and the second pocket panel 13 to reinforce the panels and reduce the risk of the material used to form the panels 4, 11 tearing or otherwise being damaged.

In embodiments, the first pocket panel 11 is attached to the main panel 4 by a depth panel 11A. The depth panel 11A is an elongate panel which is tapered towards its remote ends. A longitudinal edge of the depth panel 11A is attached to and around an edge of the main panel 4 of the cover 1 at an end thereof. The opposing longitudinal edge of the depth panel 11A is attached to and around the corresponding edge of the first pocket panel 11. Thus, the depth panel 11A provides additional depth to the first pocket 9 such that the first pocket 9 can more readily accommodate the depth of the back 7 of the seat 2. In embodiments, the depth of the first pocket 9 is greatest towards the end of the main panel 4 (as a result of the tapered form of the depth panel 13). In embodiments, the depth panel 11A has a substantially constant width and is not tapered—leading to a first pocket 9 which has a substantially uniform depth.

The free edge of the first pocket panel 11 may be provided with resilient biasing member which biases the opening of the first pocket 9 towards a closed position. The biasing member may include an elastic strip which is attached along the free edge of the first pocket panel 11.

The cover 1 includes a first portion 1A and a second 1B portion which are coupled with respect to each other by a removable coupling arrangement 14. The first portion 1A may be part of the main panel 4 and the second portion 1B may be part of the first pocket 9 (if provided). The first portion 1A may be a part of the main panel 4 and the second portion 1B may be another part of the main panel 4. The first portion 1A may be part of the main panel 4 and the second portion 1B may be part of the second pocket 12.

The coupling arrangement 14 may be configured to couple the first and second portions 1A, 1B of the cover 1 together such that they are substantially in contact with each other.

The coupling arrangement 14 is configured to decouple the first and second portions 1A, 1B of the cover 1 on the application of a sufficient force. In embodiments, the coupling arrangement 14 is configured to decouple the first portion 1A from the second portion 1B on the application of a force from a deploying airbag (which may be a seat mounted airbag).

A user may also decouple the coupling arrangement 14 manually in some embodiments to allow, for example, access for a seat belt.

The coupling arrangement 14 may comprise a hook and loop arrangement—with a hook part being provided on the first or second portion 1A, 1B of the cover 1 and a loop part being provided on the other of the first and second portion 1A, 1B such that the hook part is engageable with the loop part to couple the first and second parts 1A, 1B of the cover 1 to each other.

In embodiments, the coupling arrangement 14 may comprise a popper arrangement—with one part of the popper arrangement provided on the first portion 1A of the cover 1 and another part of the popper arrangement being provided on the second part 1B of the cover 1 such that the two parts of the popper arrangement are engageable with each other to couple the first and second portions 1A, 1B of the cover to each other.

In embodiments, the coupling arrangement 14 may comprise a tab and slot arrangement—with a tab being provided on the first or second portion 1A, 1B of the cover 1 and a slot being provided on the other of the first and second portions 1A, 1B of the cover 1. In such embodiments, the slot is configured to receive the tab and the tab includes one or more protrusions which, once forced through the slot, resist the removal of the tab from the slot until a sufficient force is applied. The tab and slot may be formed from plastic.

The first and second portions 1A, 1B of the cover 1 may be formed, according to embodiments, by a slit which extends across at least part of the width of the main panel 4 of the cover 1—with the first portion 1A being located on one side of the slit and the second portion 1B being located on the opposing side of the slit.

In embodiments, the coupling arrangement 14 comprises one part of a popper arrangement which is attached towards or to a corner of the main panel 4 adjacent a slit across at least part of the width of the main panel 4 of the cover 1. This part of the popper arrangement is mounted such that it extends away from the front surface of the main panel 4. The main panel 4 may be reinforced by additional layers of material at the mounting location for this part of the popper. The other part of the popper arrangement is attached to a tab 15 which is attached towards or to an adjacent corner of the main panel 4 which opposes the other part of the popper arrangement across the slit. In embodiments, the other part of the popper arrangement is mounted such that it extends away from the rear surface of the main panel 4. In embodiments, this part of the popper is attached to a tab 15 which is attached to the first pocket panel 11; the tab 15 may extend beyond the opening of the first pocket 9. In embodiments, this part of the popper is attached to a tab which is attached to the depth panel 11A (if provided).

Although discussed with reference to the embodiments including a coupling arrangement 14 having a popper, it will be appreciated that the popper may, in other embodiments, be substituted for other forms of coupling arrangement 14.

In embodiments, the cover 1 includes a third and fourth portion 1C, 1D which are coupled to each other by a further (or second) removable coupling arrangement 14—in a manner which corresponds with the first and second portions 1A, 1B described herein. The description in relation to the first and second portions 1A, 1B, therefore, applies equally to the third and fourth portions 1C, 1D.

In embodiments, the cover 1 includes a pair of slits. Each slit defines two respective portions 1A, 1B, 1C, 1D of the cover 1. In embodiments each slit extends across part of a width of the cover 1. In embodiments, the slits are aligned with each other. In embodiments, the slits define a width of a part of the cover 1. In embodiments, the slits are generally aligned with the opening of the first pocket 9. In embodiments, the slits extend from the outer edges of the main panel 4 of the cover 1 towards a central longitudinal axis of the cover 1.

The cover 1 may be manufactured from a woven material. The cover 1 may be manufactured from a nylon- or polyester-based material. The main panel 4 of the cover 1 may be manufactured from a different material to the first and second attachment arrangements 5, 6. The cover 1 and, in particular, the main panel 4 of the cover 1 may be manufactured from a material which has a coating intended to inhibit the soiling of the material and/or to improve the wear properties of the material.

The first and second attachment arrangement 5, 6 have been described as pockets 9, 12. It will, however, be appreciated that other attachment arrangements 5, 6 may be provided. The attachment arrangements 5, 6 may each include a member which is configured to fit around at least part of a seat 1 to secure the cover 2 to the seat 1 (or part thereof). The member may comprise a strap. The strap may comprise two parts which are configured to be coupled together around at least part of the seat 1.

The seat cover 1 is a removable cover 1 for a seat 2. Such a cover 1 is a temporary cover 1 and is distinguished from the upholstery of the seat 1 which is considered to be permanent. The seat cover 1 is suitable for use as a cover 1 for use by a mechanic. In embodiments, the seat cover 1 is configured to be fitted to a plurality of different types of seat 2. In embodiments, the cover 1 is configured to be reattachable to a seat 1 such that the cover 1 can be fitted to a seat 1, removed from the seat 1, and re-fitted to the seat 1. The seat cover 1 is an "overcover" configured to be fitted over the normal upholstery of the seat 2.

In embodiments, the or each coupling arrangement 14 is re-coupleable such that the coupling arrangement 14 can be coupled, decoupled, and then re-coupled.

The or each coupling arrangement 14 may be decoupleable manually. The or each coupling arrangement 14 may be configured such that it remains coupled when subjected to the forces normally applied when fitting the cover 1 to a seat 2.

The main panel 4 of the cover 1 may be configured such that a logo may be printed or transferred onto the main panel 4 of the cover 1.

The main panel 4 of the cover 1 is, as will be appreciated, intended to cover a substantial portion of the seat 2 to which is it to be fitted so that the upholstery of the seat 2 is protected by the main panel 4. The main panel 4 may, therefore, include a plurality of sub-panels which are connected to each other for form the main panel 4.

The edges of the or each slit described herein may include piping to reinforce the material adjacent the or each slit.

It will be appreciated that the coupling arrangement 14 (or, if applicable, the coupling arrangements 14), when decoupled, allows the first and second portions 1A, 1B (and, if applicable, the third and fourth portions 1C, 1D) of the seat cover 1 to move with respect to each other whilst the seat cover 2 is still fitted to the seat 2. This, therefore, for example, may allow an airbag to inflate more freely or allow greater access to a seat belt.

It will be appreciated that embodiments of the present invention may include vehicle maintenance kits including the seat cover 1. Further embodiments, may include a vehicle including such a maintenance kit and/or including a seat 1 to which the seat cover 2 is fitted.

It will be understood that the term "vehicle" 3 as used herein has been used as a general reference to a means of transportation. Typically, the vehicle 3 is of a type which may be subjected to periodic maintenance and which has a seat 2 which may be at risk from soiling during such maintenance. The vehicle 3 may be a land vehicle—such as a car, van, lorry, truck, bus, train. The vehicle 3 may, in embodiments, be an aeroplane, a ship, a boat, a hovercraft, a helicopter.

Embodiments of the invention are particularly useful in relation to seats which include expensive or delicate upholstery—such as leather seat covers.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A removable seat cover for a seat of a vehicle, the removable seat cover comprising:
   a main panel configured to cover at least a part of the seat;
   a first and a second portion defined by a slit which extends across at least part of a width of the main panel of the seat cover;
   a first coupling arrangement configured to couple the first and second portions of the seat cover;
   at least one attachment arrangement configured to fit the seat cover with respect to a seat of a vehicle, wherein the first coupling arrangement is configured such that the decoupling of the first coupling arrangement permits the first and second portions of the seat cover to be moved with respect to each other whilst the seat cover is substantially fitted with respect to the seat; and the first coupling arrangement is a re-coupleable coupling arrangement;
   a third and fourth portion; and a second coupling arrangement configured to couple the third and fourth portions of the seat cover, wherein the second coupling arrangement is configured such that the decoupling of the second coupling arrangement permits the third and fourth portions of the cover to be moved with respect to each other whilst the seat cover is substantially fitted with respect to the seat.

2. A seat cover according to claim 1, wherein:

the seat cover is configured to cover at least a part of a seat back, a seat squab and a seat headrest of the seat.

3. A seat cover according to claim 2, wherein:

the third and fourth portions of the seat cover are defined by a slit which extends across at least part of a width of a main panel of the seat cover; and the second coupling arrangement is a re-coupleable coupling arrangement.

4. A seat cover according to claim 1, wherein the at least one attachment arrangement includes a pocket configured to receive at least a portion of a back of the seat.

5. A seat cover according to claim 1, wherein the at least one attachment arrangement includes a pocket configured to receive at least a portion of a squab of the seat.

6. A seat cover according to claim 1, wherein the first portion of the seat cover is a portion of the main panel.

7. A seat cover according to claim 1, wherein the second portion of the seat cover is a portion of the at least one attachment arrangement.

8. A seat cover according to claim 1, wherein at least part of the coupling arrangement is provided on the at least one attachment arrangement.

9. A seat cover according to claim 1, wherein the at least one attachment arrangement includes an arrangement to attach a first part of the main panel to the back of a seat and the first portion of the seat cover is a portion of the first part of the main panel.

10. A seat cover according to claim 1, wherein a main panel of the seat cover is configured to cover at least a part of a seat back, a seat squab, and a seat headrest of the seat.

11. A vehicle maintenance kit including a removable seat cover for a seat of a vehicle, the removable seat cover comprising:

a main panel configured to cover at least a part of the seat;

a first and a second portion defined by a slit which extends across at least part of a width of the main panel of the seat cover;

a first coupling arrangement configured to couple the first and second portions of the seat cover;

at least one attachment arrangement configured to fit the seat cover with respect to a seat of a vehicle, wherein the first coupling arrangement is configured such that the decoupling of the first coupling arrangement permits the first and second portions of the seat cover to be moved with respect to each other whilst the seat cover is substantially fitted with respect to the seat; and the first coupling arrangement is a re-coupleable coupling arrangement;

a third and fourth portion; and a second coupling arrangement configured to couple the third and fourth portions of the seat cover, wherein the second coupling arrangement is configured such that the decoupling of the second coupling arrangement permits the third and fourth portions of the cover to be moved with respect to each other whilst the seat cover is substantially fitted with respect to the seat.

12. A seat cover according to claim 1, wherein the first and second portions oppose each other across the slit.

13. A seat cover according to claim 12, wherein the main panel of the seat cover is configured to cover a seat back and seat squab.

14. A seat cover according to claim 12, wherein the at least one attachment arrangement includes a pocket configured to receive at least a portion of a back of the seat and second portion is located adjacent the pocket and the first portion is spaced apart from the pocket.

15. A seat cover according to claim 14, wherein the second portion is closer to the pocket than the first portion.

16. A vehicle including a removable seat cover for a seat of the vehicle, the removable seat cover comprising:

a main panel configured to cover at least a part of the seat;

a first and a second portion defined by a slit which extends across at least part of a width of the main panel of the seat cover;

a first coupling arrangement configured to couple the first and second portions of the seat cover;

at least one attachment arrangement configured to fit the seat cover with respect to a seat of a vehicle, wherein the first coupling arrangement is configured such that the decoupling of the first coupling arrangement permits the first and second portions of the seat cover to be moved with respect to each other whilst the seat cover is substantially fitted with respect to the seat; and the first coupling arrangement is a re-coupleable coupling arrangement;

a third and fourth portion; and a second coupling arrangement configured to couple the third and fourth portions of the seat cover, wherein the second coupling arrangement is configured such that the decoupling of the second coupling arrangement permits the third and fourth portions of the cover to be moved with respect to each other whilst the seat cover is substantially fitted with respect to the seat.

17. A vehicle according to claim 16, wherein the vehicle includes a vehicle maintenance kit which includes the removable seat cover.

18. A removable seat cover for a seat of a vehicle, the removable seat cover comprising:

a main panel configured to cover at least a part of the seat;

a first and a second portion defined by a slit which extends across at least part of a width of the main panel of the seat cover;

a first coupling arrangement configured to couple the first and second portions of the seat cover;

at least one attachment arrangement configured to fit the seat cover with respect to a seat of a vehicle, wherein the first coupling arrangement is configured such that the decoupling of the first coupling arrangement permits the first and second portions of the seat cover to be moved with respect to each other whilst the seat cover is substantially fitted with respect to the seat, the second portion of the seat cover is a portion of the at least one attachment arrangement; and the first coupling arrangement is a re-coupleable coupling arrangement.

* * * * *